(12) United States Patent
Feklistov et al.

(10) Patent No.: US 7,843,657 B2
(45) Date of Patent: Nov. 30, 2010

(54) GIMBAL MOUNT

(75) Inventors: Dmitri Feklistov, Grange (AU); Ben Dunstall, Blackwood (AU)

(73) Assignee: Ellex Medical Pty Ltd. (AU)

( * ) Notice: Subject to any disclaimer, the term of this patent is extended or adjusted under 35 U.S.C. 154(b) by 186 days.

(21) Appl. No.: 12/089,293

(22) PCT Filed: Sep. 12, 2006

(86) PCT No.: PCT/AU2006/001339

§ 371 (c)(1),
(2), (4) Date: Sep. 12, 2008

(87) PCT Pub. No.: WO2007/038827

PCT Pub. Date: Apr. 12, 2007

(65) Prior Publication Data

US 2009/0103200 A1    Apr. 23, 2009

(30) Foreign Application Priority Data

Oct. 6, 2005    (AU) .............................. 2005905511

(51) Int. Cl.
*G02B 7/00*    (2006.01)
(52) U.S. Cl. ................ 359/822; 359/819; 359/820
(58) Field of Classification Search .......... 359/819, 359/820, 822–826
See application file for complete search history.

(56) References Cited

U.S. PATENT DOCUMENTS

| | | | |
|---|---|---|---|
| 5,194,993 A * | 3/1993 | Bedzyk | 359/813 |
| 5,353,167 A * | 10/1994 | Kuklo et al. | 359/876 |
| 5,502,598 A * | 3/1996 | Kimura et al. | 359/814 |
| 7,400,462 B2 * | 7/2008 | Chen | 359/820 |
| 7,688,528 B2 * | 3/2010 | Michael et al. | 359/811 |
| 2002/0114086 A1 * | 8/2002 | Morii et al. | 359/811 |
| 2005/0122590 A1 | 6/2005 | Higuchi et al. | |
| 2008/0225255 A1 * | 9/2008 | Margeson et al. | 355/67 |

FOREIGN PATENT DOCUMENTS

WO    9306515 A1    4/1993

* cited by examiner

*Primary Examiner*—Darryl J Collins
(74) *Attorney, Agent, or Firm*—Krugliak, Wilkins, Griffiths & Dougherty Co., L.P.A.; David P. Dureska; Brent L. Moore

(57) ABSTRACT

A gimbal mount in which an optical element is mounted in a carriage that mounts for rotation in a holder, which in turn mounts for rotation in a body. A first pair of counter-acting adjustment screws act upon a face of the holder to rotate the holder about a first axis. A second pair of counter-acting adjustment screws act upon a face of the carriage to rotate the carriage about a second axis. The first axis and second axis are orthogonal in the preferred embodiment.

15 Claims, 3 Drawing Sheets

GIMBAL MOUNT

CROSS-REFERENCE TO RELATED APPLICATIONS

Figure 1:
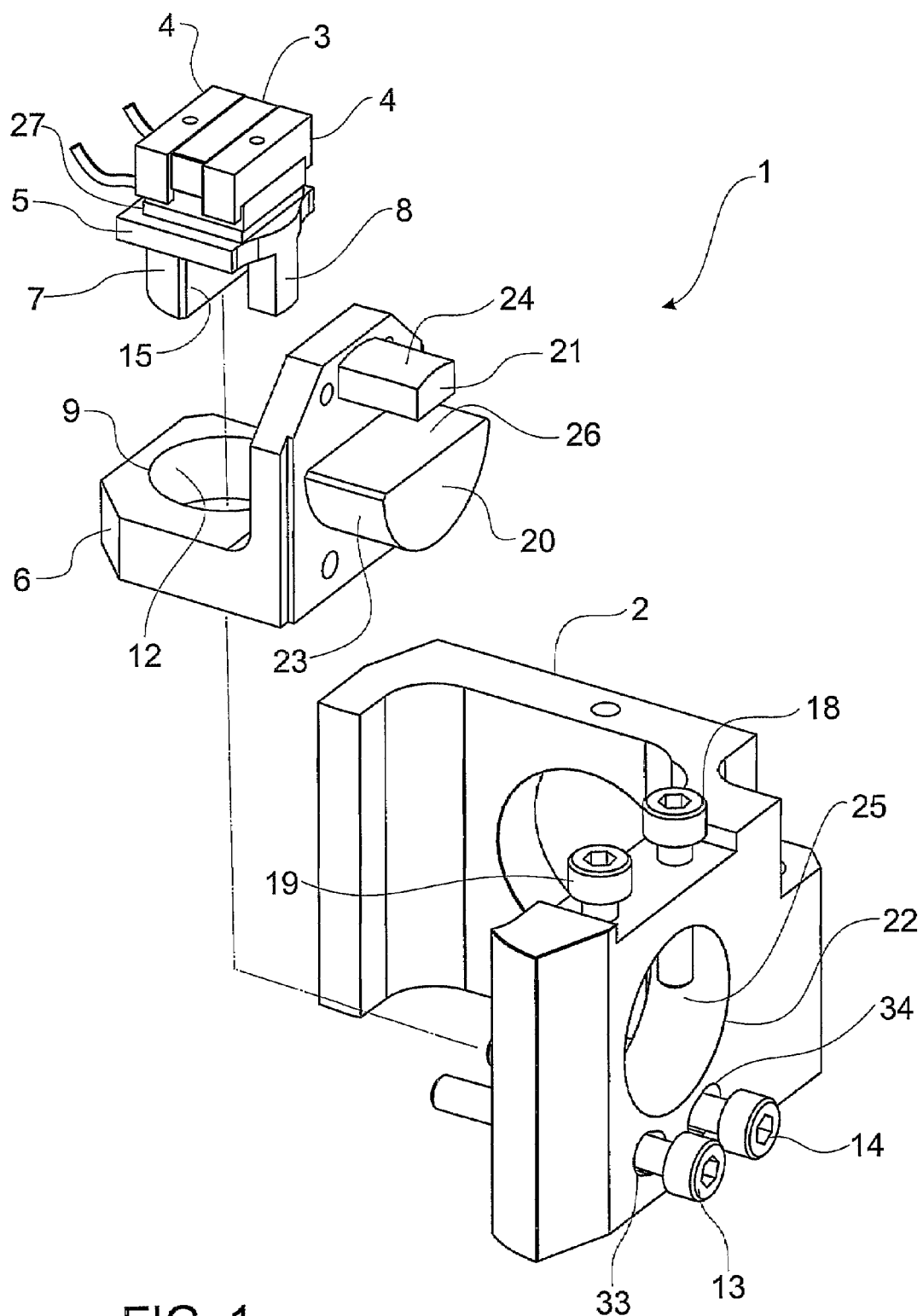

This application claims the benefit of PCT Application Ser. No. PCT/AU2006/001339 filed Sept. 12, 2006, and Australian Patent Application Serial No. 2005905511filed Oct. 6, 2005.

This invention relates to an optical component commonly referred to as a gimbal mount. A gimbal is a device with two mutually perpendicular and intersecting axes of rotation, thus giving free angular movement in two directions. In particular it relates to a gimbal mount having fine lockable adjustment useful for aligning optical components in an optical device, such as a laser.

BACKGROUND TO THE INVENTION

The precise alignment of optical components is essential to efficient operation of optical devices, such as lasers and equipment utilising lasers. Typical optical alignment devices are translation and rotation stages that are bolted together to give the desired degrees of freedom for adjustment of each optical element. Maintaining accurate alignment of every optical component can be difficult, especially if thermal changes occur. Careful adjustment of optical mounts is a skill developed early by optical engineers and scientists.

One type of mount providing rotational adjustment on two axes is a kinematic mount. An example of a kinematic mount is found in U.S. Pat. No. 4,088,396 assigned to Ardel Kinamatic. The Ardel Kinamatic mount provides for orthogonal adjustment on two axes which pass through the geometric centre of the optical component held in the mount.

U.S. Pat. No. 6,198,580 assigned to Newport Corporation also describes a kinematic mount but one which pivots about the surface of the optical element so as to avoid introducing phase shifts. Although easy to use the mount is designed as a laboratory device that will require frequent adjustment.

Frequent minor adjustment of optical alignment is not possible for commercial products. For example, laser systems are finding application in many different areas of medicine, including ophthalmology and surgery. The medical practitioner does not have the skill or the desire to make continual minor adjustments to optical alignment in order to maintain peak performance of laser equipment. For this reason it has been necessary to design optical mounts that can be set and locked in place. In addition, devices have become ever more compact and low cost thus adding the complication of requiring compact mounts which do not require adjustment after they are set, have thermal stability, and are low cost.

Thermal stability can be a critical issue for some laser related optical components and alignment devices. Optical components, such as non-linear crystals, that absorb a small percentage of the laser beam passing through it and convert it to heat, must be kept at a stable temperature to maintain optimal performance, and the heat from the optical component must not cause mechanical alignment changes. A temperature control device may be required between the optical component and the mount.

Another important consideration is that any angular rotation of the optical component is carried out around the geometric centre point. If this cannot be achieved any angular adjustment may require a compensating lateral adjustment to ensure that the beam is entering and exiting the optical component correctly. For most laser applications only a relatively small range of angular adjustment range is required, however fine adjustment over that range is required, which can then be locked without changing the alignment.

These demanding design requirements for a gimbal mount including; fine, precise and lockable angular adjustment about the geometric centre of the optical component in two planes, the ability to maintain temperature stability of the optical component, the ability to fit a temperature control device, small size, and low cost are not achieved in previous designs.

OBJECT OF THE INVENTION

It is an object of the invention to provide an optical mount that allows fine, precise and lockable orthogonal angular adjustment in two planes.

It is a further object that adjustment is about the geometric centre of the optical component.

It is another object of the invention to be able to maintain temperature stability of the optical component.

It is a still further object to provide an optical mount which is low cost and compact.

Further objects will be evident from the following description.

DISCLOSURE OF THE INVENTION

In one form, although it need not be the only or indeed the broadest form, the invention resides in an optical mount providing orthogonal angular adjustment of an optical element on two axes comprising:
a body;
a holder mounted for rotation within the body about a first axis; a first pair of counter-acting adjustment means that act upon a face of the holder to rotate the holder about the first axis and to lock the holder;
a carriage mounted for rotation within the holder about a second axis and mounting the optical element; and
a second pair of counter-acting adjustment means that act upon a face of the carriage to rotate the carriage about the second axis and lock the carriage.

Suitably the second axis is orthogonal to the first axis.

Preferably the first axis and the second axis intersect at a geometric centre of the optical element.

The counter-acting adjustment means are suitably screws.

The optical mount may further comprise means for thermal regulation of said optical element.

The carriage and holder are preferably made from a material with high thermal conductivity such as copper while the body can be made of aluminium.

BRIEF DETAILS OF THE DRAWINGS

Figure 2:
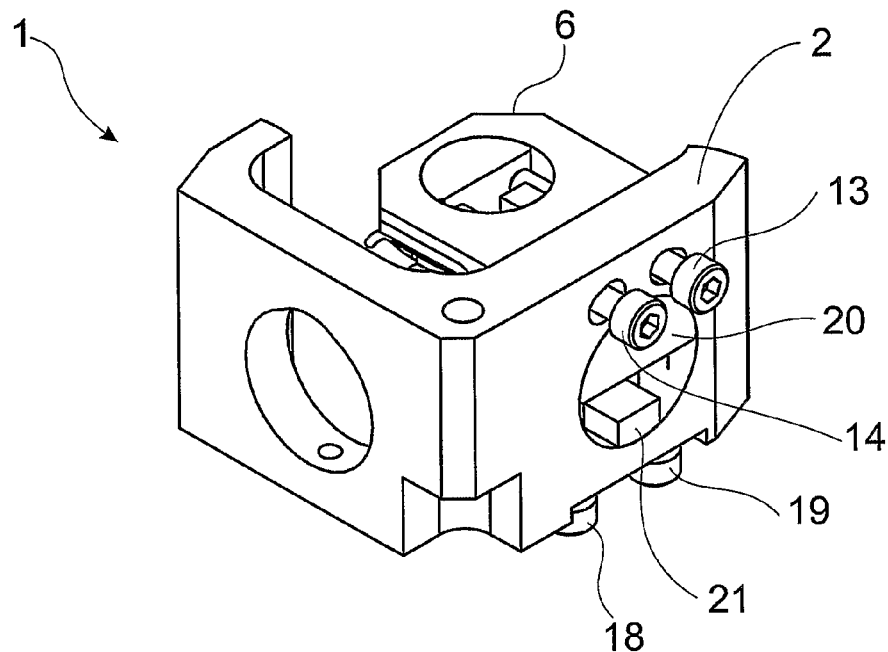
Figure 3:
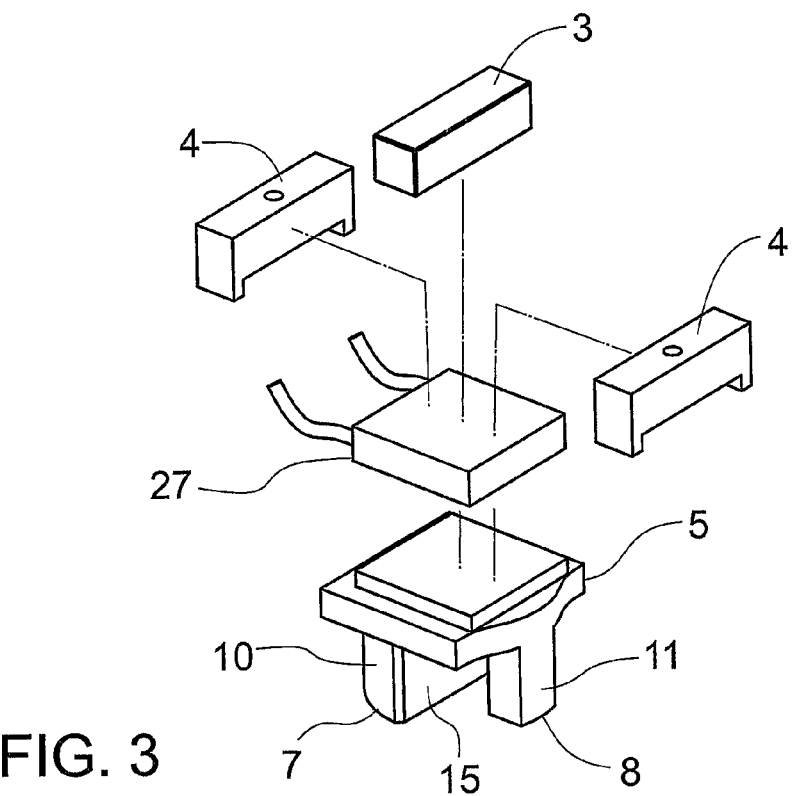
Figure 6:
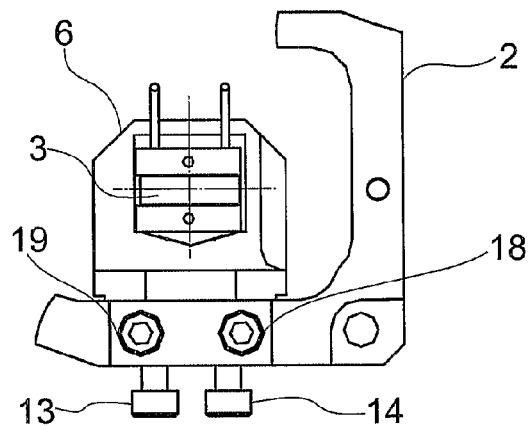
Figure 4:
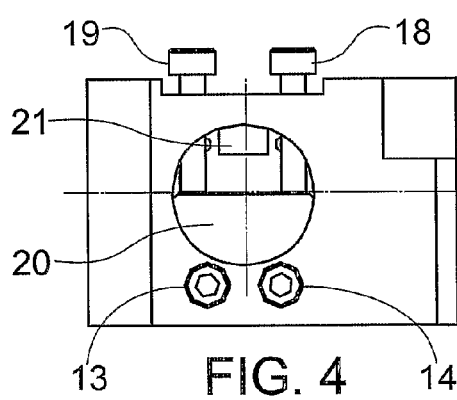
Figure 5:
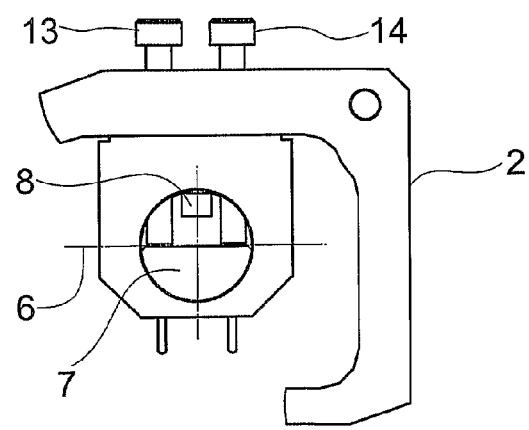

To assist in understanding the invention preferred embodiments will now be described with reference to the following figures in which:
FIG. 1 is an exploded view of an optical mount;
FIG. 2 is a sketch of the optical mount of FIG. 1;
FIG. 3 is an exploded view of a part of the optical mount of FIG. 1;
FIG. 4 is a front view of the optical mount of FIG. 1;
FIG. 5 is a bottom view of the optical mount of FIG. 1;
FIG. 6 is a top view of the optical mount of FIG. 1; and
FIG. 7 displays the axes of rotation.

DETAILED DESCRIPTION OF THE DRAWINGS

In describing different embodiments of the present invention common reference numerals are used to describe like features.

Referring to FIG. 1 there is shown an exploded view of an optical mount 1 comprising a body 2 that fits into an ophthalmic laser system. The embodiment of FIG. 1 shows details of a mount designed for a specific device. It will be appreciated that the invention is not limited to the particular arrangement shown but is merely convenient for demonstrating the principle of operation of the invention in a real situation. For ease of view the mount of FIG. 1 is displayed in FIG. 2 inverted from the normal mounted position.

An optical element 3 is secured by a thermally regulated clamp 4 in a carriage 5 that is able to rotate in holder 6. Although the clamp 4 is thermally controlled in the preferred embodiment this is not an essential feature of the optical mount. However the design of the mount provides good thermal stability for the reasons explained below.

The structure of the carriage 5 is seen most clearly in the exploded view of FIG. 3. The carriage 5 has a semi-cylindrical shaft 7 and stub 8 that fit within aperture 9 in the holder 6. The outer surface 10 of shaft 7 and the outer surface 11 of the stub 8 correspond to the surface of a cylinder having a diameter just less than the diameter of the aperture 9. The aperture 9 has an inner cylindrical bearing surface 12. Stub 8 acts with shaft 7 to positively locate the carriage 5 on the holder 6 such that the outer surface 10 of the shaft 7 and the outer surface 11 of the stub 8 rotate smoothly on the bearing surface 12 of the aperture 9.

Careful machining of the bearing surfaces 10, 11, 12 result in a snug fit of the shaft 7 and stub 8 in the aperture 9 so that the rotation of the holder is positive and stable. The close contact between the surfaces also provides good thermal contact, for reasons that will be clearer later.

A pair of counter-acting adjustment screws 13, 14 screw into and through the holder 6 to push against adjustment surface 15. The screws 13, 14 have a fine thread so that fine rotation of the holder carriage 5 is effected by fine adjustment of the screws 13, 14. As shown in FIG. 2, the screws 13, 14 pass through holes 33, 34 in the body 2. This is preferable for easy adjustment of the rotation of the carriage.

For instance, looking particularly at FIG. 1, advancing screw 13 into the holder 6 will cause clockwise rotation of the carriage 5. When the carriage 5 is in the correct position the screw 14 is tightened to secure the carriage 5 at the chosen angle. Similarly, backing off screw 13 and advancing screw 14 will cause an anti-clockwise rotation of the carriage 5. Screw 13 is tightened when the carriage 5 is in the desired position.

Figure 7:
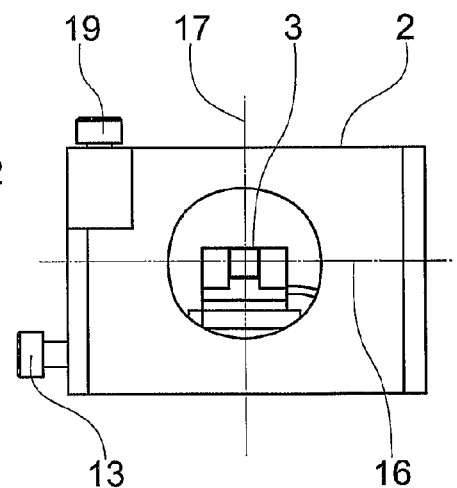

The adjustment screws 13, 14 provide rotational adjustment of the optical element 3 about the primary axis 17 shown in FIG. 7. Rotational adjustment about the secondary axis 16 is provided by adjustment screws 18, 19 acting on holder 6 in the same manner as described above. As is clear from FIG. 7, the optical mount achieves orthogonal angular adjustment about the geometric centre of the optical element 3.

The structure of holder 6 is seen most clearly in FIG. 1. The holder 6 has a semi-cylindrical shaft 20 and stub 21 that fit within aperture 22 in the body 2, as shown in FIG. 1. The outer surface 23 of shaft 20 and the outer surface 24 of the stub 21 correspond to the surface of a cylinder having a diameter just less than the diameter of the aperture 22. The aperture 22 has an inner cylindrical bearing surface 25. Stub 21 acts with shaft 20 to positively locate the holder 6 in the body 2 such that the outer surface 23 of the shaft 20 and the outer surface 24 of the stub 21 rotate smoothly on the bearing surface 25 of the aperture 22.

The pair of counter-acting adjustment screws 18, 19 screw through the body 2 and push against adjustment surface 26.

The screws 18, 19 have a fine thread so that fine rotation of the holder 6 is effected by fine adjustment of the screws 18, 19.

For instance, looking particularly at FIG. 4, advancing screw 18 into the body 2 will cause clockwise rotation of the holder 6. When the holder 6 is in the correct position the screw 19 is tightened to secure the holder 6 at the chosen angle. Similarly, backing off screw 18 and advancing screw 19 will cause an anti-clockwise rotation of the holder 6. Screw 18 is tightened when the holder 6 is in the desired position.

Looking particularly at FIG. 1 it can be seen that the rotational position of optical element 3 is adjusted in the primary plane by adjustment screws 13, 14 and in the secondary plane by screws 18, 19. The optical mount 1 is fixed in position in an optical device, such as a laser, with the optical element correctly positioned in the beam path. True orthogonal angular alignment is achieved by the adjusting screws which also lock the holder 6 and carriage 5 in position within the body 2.

As mentioned above the optical mount 1 provides better thermal stability than most prior art adjustable optical mounts. The large contact surface areas between the carriage, the holder, and the body mean that the optical mount remains in thermal equilibrium thereby avoiding misalignment caused by thermal gradients within the mount. In addition, the locking of the holder by sequential tightening of the adjustment screws has the effect of clamping the shaft surfaces 10 and 23 against their respective bearing surfaces 12 and 25 which ensures good thermal conduction between the mechanical parts. Carriage 5, holder 6 and clamp pieces 4 are preferably made from a material with high thermal conductivity such as copper while the body 2 can be made of aluminium.

If thermal control is needed, as will be the case with most non-linear crystals, an active element is incorporated into the carriage 5 as shown particularly in FIG. 3. A Peltier chip 27 is located beneath the optical element 3 and held in place by clamps 4. Alternative methods of thermal regulation, such as water cooling, may also be incorporated into the mount. The optical element 3 is bonded to the clamping pieces 4 and Peltier chip 27 using a thermally conducting epoxy adhesive. If active thermal regulation is not required the optical element 3 can be clamped directly to the carriage 5, with suitable adjustment to the height of the carriage to ensure that the optical element 3 is mounted in line with the centre of secondary axis rotation 16. Similar adjustment can also be applied to allow the use of different size optical elements.

The optical mount is a low cost, compact device providing fine, precise and lockable orthogonal angular adjustment about the geometric centre of the optical component in two planes. It has the ability to maintain temperature stability of the optical component and to fit a temperature control device.

Throughout the specification the aim has been to describe the invention without limiting the invention to any particular combination of alternate features.

The invention claimed is:

1. An optical mount providing orthogonal angular adjustment of an optical element about two axes comprising:
   a body;
   a holder mounted for rotation within the body about a first axis;
   a first pair of counter-acting adjustment means that act upon a face of the holder to rotate the holder about the first axis and to lock the holder;
   a carriage mounted for rotation within the holder about a second axis and mounting the optical element; and
   a second pair of counter-acting adjustment means that act upon a face of the carriage to rotate the carriage about the second axis and lock the carriage;

wherein at least one of the holder or the carriage comprise a semi-cylindrical shaft and stub that locate for rotation.

2. The optical mount of claim 1 wherein the second axis is orthogonal to the first axis.

3. The optical mount of claim 1 wherein the first axis and the second axis intersect at a geometric centre of the optical element.

4. The optical mount of claim 1 wherein the counter-acting adjustment means are screws.

5. The optical mount of claim 1 further comprising means for thermal regulation of the optical element.

6. The optical mount of claim 1 further comprising a thermally regulated clamp mounting the optical element in the carriage.

7. The optical mount of claim 1 wherein at least the holder and the carriage are made from a material with high thermal conductivity.

8. The optical mount of claim 7 wherein the material is copper.

9. The optical mount of claim 1 wherein the body is made from aluminium.

10. The optical mount of claim 1 wherein the holder comprises a semi-cylindrical shaft and stub that locate for rotation in an aperture in the body.

11. The optical mount of claim 10 wherein the semi-cylindrical shaft and stub have outer hearing surfaces and the aperture in the body has an inner bearing surface.

12. The optical mount of claim 1 wherein the carriage comprises a semi-cylindrical shaft and stub that locate for rotation in an aperture in the holder.

13. The optical mount of claim 12 wherein the semi-cylindrical shaft and stub have outer bearing surfaces and the aperture in the holder has an inner bearing surface.

14. The optical mount of claim 1 wherein both the holder and the carriage comprise a semi-cylindrical shaft and stub that locate for rotation in an aperture in the body and holder respectively.

15. The optical mount of claim 14 wherein the semi-cylindrical shaft and stub have outer bearing surfaces and the aperture in the holder and the aperture in the body have inner bearing surfaces.

* * * * *